United States Patent Office 2,835,626
Patented May 20, 1958

2,835,626

PROCESS FOR THE PRODUCTION OF NEW PYRIDAZINE DERIVATIVES AND THEIR USE AS FUNGICIDES

Alfred Margot and Hans Gysin, Basel, Switzerland, assignors to J. R. Geigy A.-G., Basel, Switzerland, a Swiss firm No Drawing. Application June 11, 1956
Serial No. 590,348

Claims priority, application Switzerland June 17, 1955

6 Claims. (Cl. 167—33)

The present invention is concerned with new pyridazine derivatives and the production thereof as well as with fungicidal agents which contain such compounds and with the use thereof for the control of fungi.

Surprisingly it has been found that new pyridazine derivatives which have excellent fungicidal properties are obtained if trichloromethane sulphenyl chloride (perchloromethylmercaptan) is reacted with a hydroxy or mercapto pyridazine of the general formula:

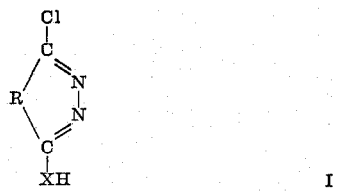

wherein R represents the vinylene radical, or an o-phenylene radical which may be substituted by halogen and/or nitro groups, and X represents oxygen or sulphur.

The reaction products obtained correspond to the general formula:

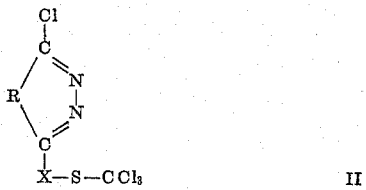

As, in the concentrations necessary to attain a fungicidal action, they are not phytotoxic and are only slightly toxic to warm blooded animals, they are excellently suitable as active ingredients for fungicidal agents, in particular for application in plant protection.

When pyridazine derivatives of the general Formula I in which X represents oxygen are used for the reaction with perchloromethylmercaptan, the presence of an acid binding agent is necessary to perform the reaction or such hydroxypyridazine derivatives must be used in the form of their salts with inorganic or organic bases. Reactions of perchloromethylmercaptan with hydroxypyridazine derivatives can be performed, for example in a two-phase system from a diluted alkali lye and an organic solvent which is not miscible with water, whilst alkali salts of hydroxypyridazine derivatives can be reacted with perchloromethylmercaptan for example suspended in organic solvents. In contrast to the hydroxypyridazine derivatives the mercapto pyridazine derivatives react with perchloromethylmercaptan also in the absence of any acid binding agent or further condensing agent. Suitable starting materials of the general Formula I are, for example the following pyridazine derivatives: 3-chloro-6-hydroxy pyridazine, 3-chloro-6-mercapto pyridazine, 1-chloro-4-hydroxy and 1-chloro-4-mercapto phthalazine, 1.5.8 - trichloro - 4 - hydroxy phthalazine, 1.5.6.7.8-pentachloro-4-hydroxy phthalazine, 1.5.6.7.8-pentachloro-4-mercapto phthalazine, 1-chloro-5(8)-nitro-4-hydroxy phthalazine and 1-chloro-6(7)-nitro-4-hydroxy phthalazine.

The following examples further illustrate the production of the new pyridazine derivatives. Parts are given as parts by weight and their relationship to parts by volume is as that of grammes to cubic centimetres. The temperatures are in degrees centigrade.

Example 1

19 parts of perchloromethylmercaptan are added dropwise while stirring at about 15° to a mixture of 13 parts of 3-hydroxy-6-chloro pyridazine, 100 parts by volume of N-caustic soda lye and 100 parts by volume of chloroform, and the whole is stirred for some hours at room temperature. The layers are separated, the chloroform phase is washed with diluted caustic soda lye and water and the solvent is evaporated off. The 3-trichloromethane sulphenyloxy-6-chloro pyridazine which remains is a crystalline substance and can be further purified for example by recrystallisation from methanol. The colourless product melts at 156–157°.

Example 2

19 parts of perchloromethylmercaptan are added dropwise at room temperature to a suspension of 14.6 parts of finely pulverized 3-mercapto-6-chloro pyridazine in 150 parts by volume of water and the whole is stirred for another day at room temperature. The precipitate is filtered off under suction and washed well with water. By recrystallising the crude 3-trichloromethane sulphenyl thio-6-chloro pyridazine from cyclohexane, the substance is obtained as colourless needles which melt at 94–95°.

Example 3

.2 part of abs. sodium salt of 1-chloro-4-hydroxy benz-pyridazine are suspended in 200 parts by volume of chloroform and, without cooling, 18.5 parts of perchloromethylmercaptan are poured in whereupon slight heat is generated. After cooling to 20°, 100 parts by volume of water are added at this temperature while stirring, the addition being made within 10–15 minutes; stirring is continued for 15 minutes and then any unreacted starting material is filtered off under suction. The chloroform layer is separated and the solvent distilled off leaving the 1-chloro-4-trichloromethane sulphenyloxy phthalazine which is practically colourless and in coarse crystalline form. It can possibly also be washed with a little isopropyl alcohol. Recrystallised from benzene it melts at 154–156° and is colourless.

In an analogous manner, 1-chloro-5(8)-nitro-4-trichloromethane sulphenyloxy phthalazine is obtained; M. P. 203–204°.

The new pyridazine derivatives can be used in a finely distributable form as such or combined with suitable carriers and distributing agents for the protection of plants and parts thereof against attack by injurious fungi. They are also suitable for the treatment of organic materials such as, e. g. wood, textiles, hides and leather. However, they can also be used in combination with other suitable organic and inorganic fungicidal or insecticidal substances.

For example, the new active ingredients can be combined with solid pulverulent carries such as, e. g. talc, kaolin, bole, bentonite, chalk or ground limestone. The pulverulent fungicides obtained can be made suspendible in water if desired, by the addition of suitable wetting and dispersing agents. Further, the active ingredients as such in solid finely ground form can also be suspended in water with the aid of capillary active substances, or, they can be emulsified in water after being dissolved in organic solvents with the aid of suitable emulsifiers. In addition, the active ingredients can be dissolved in organic solvents, e. g. in chlorinated hydrocarbons such as trichlorethylene, or in medium petroleum fractions, possible with the addition of auxiliary solvents such as acetone or higher ketones. Finally the active ingredients can be distributed in the air in the form of aerosols, smoke or mist, in particular in store rooms and greenhouses.

Example 4

2–5 parts of active ingredients, e. g. 1-chloro-4-trichloromethane sulphenyloxy - phthalazine, are finely ground with 98–95 parts of talc. The dust so obtained can be used for example for the disinfection of bedding earth as well as for dusting of plants or parts thereof such as bulbs and tubers.

If the amount of active ingredient is increased to 15 parts and some adhesive agent is added, then a strongly fungicidal dry seed dressing agent is obtained which at the same time does not affect germination.

Example 5

By grinding 10 parts of 3-trichloromethane sulphenyloxy-6-chloro pyridazine with 82 parts of kaolin or chalk and mixing with 8 parts of wetting and dispersing agents, e. g. ethylene oxide condensation products of alkyl phenols, a concentrate is obtained which, on mixing with water, produces a fungicidal spraying agent which is excellently suitable for the treatment of parts of plants above the ground.

Example 6

20 parts of 3-trichloromethane sulphenyl mercapto-6-chloro pyridazine, 50 parts of xylene and 30 parts of ethylene oxide condensation products of alkyl phenols are mixed and an emulsion concentrate is obtained which can be used for the preparation of emulsions in plant protection.

A concentrate for the production of less strongly wetting emulsions is obtained by mixing 25 parts of active ingredient, 67 parts of xylene and 8 parts of ethylene oxide condensation products.

Example 7

A wettable powder containing 50% of 1-chloro-4-trichlor methanesulfenyloxy-phthalazine was diluted up to a concentration of 0.25% of active ingredient and used for the control of the downy mildew of the vine (*Plasmopara viticola*). A vineyard was sprayed every two weeks during three months. At the end of the treatment the grapes showed practically no infestation, while the leaves showed a weak infestation. Of the untreated controls, grapes and leaves were heavily infested.

What we claim is:

1. A pyridazine derivative corresponding to the formula:

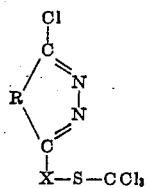

wherein R represents a member selected from the group consisting of a vinylene, o-phenylene, chloro-o-phenylene and nitro-o-phenylene radical, and X represents a member selected from the group consisting of oxygen and sulphur.

2. 1-chloro-4-trichlormethanesulfenyloxy phthalazine.

3. A fungicidal composition comprising as active ingredient a pyridazine derivative as claimed in claim 1, in an amount and concentration sufficient to inhibit the growth of fungi, and a fungicide adjuvant as a carrier.

4. A fungicidal composition comprising as active ingredient a pyridazine derivative as claimed in claim 1, in an amount and concentration sufficient to inhibit the growth of fungi, and an inert solid powder as a carrier and a wetting and dispersing agent.

5. 3-trichloromethane sulfenyloxy-6-chloro-pyridazine.

6. 3-trichloromethane sulfenylmercapto-6-chloro-pyridazine.

No references cited.